United States Patent Office

3,167,119
Patented Jan. 26, 1965

3,167,119
OIL RESERVOIR DEPLETION PROCESS
Victor G. Meadors, Tulsa, Okla., assignor to Jersey Production Research Company, a corporation of Delaware
No Drawing. Filed Apr. 4, 1961, Ser. No. 100,518
14 Claims. (Cl. 166—9)

The present invention relates to methods for the recovery of crude oil from reservoirs underlying the earth's surface and more particularly relates to an improved oil recovery process which permits greater depletion of such reservoirs than has generally been possible with processes available in the past. In still greater particularity, the invention relates to a recovery process wherein a bank of sulfuric acid or of a similar acid containing a sulfo group is established in a subsurface reservoir in the vicinity of one or more injection wells and is utilized to displace crude oil through the reservoir toward one or more production wells.

This application is a continuation-in-part of application Serial No. 809,590 "Enhancing Petroleum Oil Production," filed in the United States Patent Office in the name of Victor G. Meadors on April 29, 1959, now U.S. Patent 3,047,062.

Oil field recovery processes have received increasing attention in recent years because of a steady growth in the demand for products derived from crude oil. Experience has shown that conventional primary recovery processes, those based upon use of the natural reservoir energy, seldom permit the production of more than about a third of the oil initially present in a reservoir and that secondary methods utilizing energy supplied from an external source are required to reduce the amount of oil which must utimately be left behind as unrecoverable. The secondary recovery methods most widely used to date are those in which a fluid is introduced into the reservoir through one or more injection wells in order to displace the oil toward one or more production wells from which it can be recovered. Fluids which have been employed in this manner include water, air, natural gas, carbon dioxide, liquefied petroleum gases and the like. Such processes are reasonably effective under certain circumstances and may in some cases permit the recovery of nearly as much additional oil as was obtained during the primary recovery opeartion. Even in these instances, however, a significant amount of oil is left in the reservoir following the recovery operation. It has been estimated that at least half of all the oil discovered in the past is contained in subsurface reservoirs from which it cannot be economically recoverd by recovery methods now available.

The present invention provides a new and improved oil field recovery process which is considerably more effective than processes utilized heretofore. In accordance with the invention, it has now been found that the establishment of a bank of concentrated sulfuric acid, or of a similar acid containing a sulfo group, in a subsurface oil-bearing reservoir in the vicinity of one or more injection wells and the utilization of such a bank to displace oil through the reservoir toward one or more production wells permits depletion of the reservoir to a surprisingly low residual oil content. Studies and comparative tests have shown that the process is more effective than conventional processes for the primary and secondary recovery of crude oil and that it is particularly adapted for the recovery of heavy, viscous oils difficult to recover by other methods.

The acids utilized in the process of the invention are inorganic acids containing a sulfo group and include sulfuric acid, fuming sulfuric acid, chlorosulfonic acid, fluosulfonic acid and the like. All of these acids exhibit similar properties in the presence of fluids found in subsurface oil-bearing reservoirs. Such acids are preferably employed in concentrations in excess of about 90 percent and may in addition contain substantial quantities of dissolved sulfur trioxide. The use of fuming sulfuric acid or oleum is particularly preferred. The acids may be utilized as solutions in oil, liquid sulfur dioxide or other suitable solvent if desired.

In carrying out the process of the invention, a bank of an acid containing a sulfo group or a bank of a solution of such an acid is first established in a subsurface oil-bearing reservoir in the vicinity of one or more injection wells drilled into the reservoir. The bank may be established by the direct injection of the acid or acid solution or by the introduction of gaseous sulfur trioxide into the reservoir through the injection wells. Sulfur trioxide is highly soluble in the connate water in the reservoir and immediately reacts to form sulfuric acid. A small amount of water may in some cases be injected into the reservoir prior to the introduction of sulfur trioxide. The sulfur trioxide may be shipped to the site in conventional cylinders or in some cases may be generated on location by the oxidation of sulfur.

The size of the acid bank employed will depend upon a number of factors, including the particular recovery pattern employed, the thickness of the reservoir, the nature of the rock making up the reserovir, and the distance between injection and production wells in the reservoir. Tests have shown that the residual oil content of the reservoir at the conclusion of the process of the invention is normally an inverse function of the amount of acid utilized but that economic considerations often favor the use of banks of only moderate size. As a general rule, the volume of acid employed will constitute from about one to about fifty percent of the pore volume of the reservoir being exploited. The volume required for a particular reservoir can readily be calculated from information as to the distance between the injection point and the most remote production well, the average thickness of the reservoir, and the average porosity of the oil-bearing formation. Such information is normally available with respect to any reservoir in which a recovery operation is to be carried out. Methods for making the necessary calculations will be familiar to those skilled in the art. The use of acid banks of from about five to about fifteen percent of the reservoir pore volume has beeen found to be generally satisfactory and will be preferred in most primary and secondary recovery operations.

Injection of the acid or sulfur trioxide into the reservoir through the injection wells normally presents no serious difficulties. Although the acid is corrosive, damage to equipment at the injection well is normally slight because of the relatively short time required to establish an acid bank of moderate size. Conventional tubing and other apparatus may therefore be employed. In some cases, however, it may be preferred to employ equipment constructed of materials which have greater corrosion resistance than ordinary steel. Corrosion inhibitors can often be used to advantage.

Following establishment of the acid bank in the reservoir in the vicinity of one or more injection wells, a driving fluid is injected in order to propel the acid bank through the reservoir toward one or more production wells. The fluid utilized may be injected at pressures ranging from values slightly in excess of the reservoir pressure up to values approaching the formation breakdown pressure, depending upon the porosity and permeability of the reservoir and the distance between the injection and production wells. Suitable driving fluids include water, air, natural gas, liquefied petroleum gases, carbon dioxide, combustion gases, alkylene oxides such as ethylene oxide and propylene oxide, and the like.

Water is generally preferred because of its low cost and ready availability but in some cases a combination of driving fluids may be used. The injection of a bank of ethylene oxide or a bank of natural gas after the acid has been injected and the use of water to propel the oxide or gas and the acid through the reservoir, for example, may be advantageous in some cases. Corrosion inhibitors, bactericides, thickening agents, tracers and other additives may be incorporated in water used as a driving fluid. Conventional injection procedures and equipment may be employed.

As the acid bank is advanced into the reservoir by the driving fluid, it displaces oil, connate water and gas toward the production wells. The mechanisms involved in the process are not fully understood but there are several possible explanations for the higher oil recovery obtained. One explanation is that the acid reacts with aromatic and olefinic constituents of the crude oil to form surface active sulfonic acids which reduce the interfacial tension between the water and oil in the reservoir. Another explanation may be that surface active salts having a similar effect upon interfacial tension are produced by reaction of the acids with naturally occurring basic constituents of the oil. Still another possibility is that the acid forms a phase which is miscible with the oil and hence behaves somewhat in the manner of an amphipathic solvent. The effect of the acid upon the mobility ratio, the temperature rise due to the heat of reaction of the acid and other phenomena may also play important roles. None of these mechanisms alone appears adequate to explain the improved results obtained and hence it is probable that several factors are responsible for the improved recovery. Regardless of the particular mechanisms involved, however, it has been found that the process of the invention permits significantly greater oil recovery than is ordinarily obtained by other methods.

Oil, gas, connate water, spent acid and driving fluid are recovered at the production wells during the process. The spent acid is generally present in small amounts and poses no severe corrosion problems. Any traces of acid remaining in the oil itself are readily removed during preliminary refining operations. The injection of driving fluid and the recovery of oil in this manner are continued until the ratio of oil to driving fluid falls below the economic limit. From about one to about five reservoir pore volumes of driving fluid will normally be injected before the recovery operation is terminated.

Any of a variety of recovery patterns may be used in carrying out the process of the invention. Conventional patterns which may be employed include the five spot, seven spot, nine spot, line-drive and circular-drive systems. The pattern used need not cover the entire reservoir and hence in large reservoirs several patterns may be exploited simultaneously or sequentially. To determine the quantity of acid to be employed in the process, the volume of the reservoir underlying the particular pattern being used, rather than the total reservoir volume, should be considered. In line-drive operations for example, it is normally assumed that the pore volume of the portion of the reservoir under exploitation between each row of injection wells and an adjacent row of production wells is the total pore volume of the reservoir underlying the lateral area between the two rows. The quantity of acid to be injected through a row of injection wells in such a system will therefore preferably constitute from about five to about fifteen percent of the total reservoir volume underlying the area between the two rows.

The process of the invention may be applied to any subsurface oil-bearing reservoir but, as pointed out heretofore, it is particularly attractive for use in connection with reservoirs containing heavy viscous oils. Conventional primary and secondary recovery processes are normally much less effective in reservoirs of this type. The increased recovery made possible by the present process is therefore particularly significant in the exploitation of such reservoirs. In the case of reservoirs containing very viscous oil, it will sometimes be preferred to omit the conventional primary recovery operations altogether and to utilize an acid bank for the complete exploitation of such reservoirs.

The advantages of the process of the invention can be better understood by considering the results obtained in a series of tests carried out to demonstrate the process. These tests were carried out with linear models prepared by packing unsorted sand from the Gifford Hill formation into steel cylinders ¾ of an inch in diameter and 12 inches in length. The models were saturated with water and a heavy crude oil having a viscosity of about 400 centipoises under reservoir conditions to simulate actual reservoirs partially depleted by primary production. Water and water-driven banks of concentrated sulfuric acid were then used to displace oil from the models. The concentration of the acid employed was between 90 and 98 percent in all cases. The amount of oil recovered during each run was measured and expressed as a percentage of the oil initially in place in the model. The results obtained in these tests are set forth in the following table.

*Table 1*

RECOVERY OF HEAVY CRUDE OIL WITH SULFURIC ACID AT 60° F.

| Run | Acid Bank Size, Pore Volume | Fluid Throughput, Pore Volume | Residual Oil Content of Model, Percent Oil Initially in Place |
| --- | --- | --- | --- |
| A | 0 | 0 | 100.0 |
|   |   | 0.5 | 71.0 |
|   |   | 1.0 | 68.5 |
|   |   | 1.5 | 67.5 |
|   |   | 2.0 | 66.5 |
| B | 0.070 | 0 | 100.0 |
|   |   | 0.5 | 60.0 |
|   |   | 1.0 | 46.4 |
|   |   | 2.5 | 36.0 |
|   |   | 2.0 | 29.5 |
| C | 0.096 | 0 | 100.0 |
|   |   | 0.5 | 60.0 |
|   |   | 1.0 | 44.5 |
|   |   | 1.5 | 25.7 |
|   |   | 2.0 | 16.4 |
| D | 0.103 | 0 | 100.0 |
|   |   | 0.5 | 54.0 |
|   |   | 1.0 | 38.5 |
|   |   | 1.5 | 7.0 |
|   |   | 2.0 | 6.6 |

It can be seen from the above table that the injection of water into the model in Run A permitted the recovery of only about a third of the oil initially in place and that two-thirds of the oil present at the start of the operation was left behind as residual oil. When a water-driven bank of concentrated sulfuric acid was utilized in place of water alone, the residual oil content was markedly reduced. The use of a ten percent bank of acid, 0.103 pore volume, in Run D resulted in a residual oil content of only 6.6 percent of the oil initially in place. The acid thus effected about a ten-fold reduction in the residual oil content.

It will be noted from the table that the total fluid throughput in each run was 2.0 pore volumes and that, in the reference waterflood and in Run D where a 0.103 pore volume bank of acid was used, the residual oil content showed little change after 1.5 pore volumes of fluid had been injected. This indicates that recovery was essentially completed in these runs and that the injection of additional water would probably have produced little additional oil. In Runs B and C, on the other hand, there was a substantial reduction in residual oil content as a result of the last half pore volume of water injected. This suggests that further reductions in residual oil content could undoubtedly have been obtained if these runs had been continued beyond the 2.0 total fluids throughput. In normal operation the process will be continued until the ratio of oil to driving fluid at the production well reaches an uneconomical level and hence the amount of driving fluid injected following establishment of the acid bank may be varied.

It will also be noted from Table I above that the residual oil content decreased as the size of the acid bank was increased. A bank equivalent to 7% of the reservoir pore volume resulted in a residual oil content of 29.5% of the oil initially in place, while a 10% bank reduced the oil content to 6.6% of the oil initially in place. It is generally preferred to employ a bank of from about 5% to about 15% of the reservoir pore volume but in some cases banks of larger size may be utilized.

The results obtained when sulfuric acid was used to displace a light crude oil having a viscosity of 20 centipoises under reservoir conditions from Gifford Hill sand are shown in Table II below.

*Table II*

RECOVERY OF LIGHT CRUDE OIL WITH SULFURIC ACID AT 60° F.

| Run | Acid Bank Size, Pore Volume | Fluid Throughput, Pore Volume | Residual Oil Content of Model, Percen of Oil Initially in Place |
|---|---|---|---|
| A | 0 | 0 | 100.0 |
|   |   | 0.5 | 63.0 |
|   |   | 1.0 | 52.9 |
|   |   | 1.5 | 46.6 |
|   |   | 2.0 | 43.5 |
| B | 0.114 | 0 | 100.0 |
|   |   | 0.5 | 43.8 |
|   |   | 1.0 | 33.5 |
|   |   | 1.5 | 25.7 |
|   |   | 2.0 | 22.5 |

The data set forth in Table II above show that the process of the invention is not limited to reservoirs containing heavy viscous oils and that its use permits substantial reductions in the residual oil content of reservoirs containing oils of only average viscosity. The results obtained in this second set of tests were somewhat less spectacular than those obtained in the earlier runs but were nevertheless significant. The residual oil content after 2.0 pore volume of water had been injected was 43.5% of the oil initially in place; whereas that in the run using an acid bank was 22.5% of the oil initially in place. Use of the acid thus halved the amount of oil left behind in the model. It is evident that the process of the invention may permit the recovery of substantial quantities of oil from watered-out reservoirs that have been substantially depleted by both primary recovery and conventional waterflooding operations.

It will be understood that the scope of the invention is not to be limited to the specific examples set forth above and that obvious modifications of the process described are within the skill of those familiar with the art. The scope of the invention is defined in the appended claims.

What is claimed is:

1. In an oil recovery process wherein a driving fluid is injected into a subterranean oil-bearing reservoir through an injection well to displace crude oil toward a production well and oil not displaced from sections of said reservoir through which said driving fluid passes remains behind as residual oil at the conclusion of said process, the improvement which comprises establishing a bank of a concentrated inorganic acid containing a sulfo group in said reservoir in the vicinity of said injection well, thereafter injecting said driving fluid into said reservoir through said injection well to propel said bank of acid and crude oil through said reservoir toward said production well, and recovering crude oil displaced by said bank of acid and said driving fluid through said production well.

2. A process as defined by claim 1 wherein said acid is sulfuric acid.

3. A process as defined by claim 1 wherein said acid is chlorosulfonic acid.

4. A process as defined by claim 1 wherein said acid is fluosulfonic acid.

5. A process as defined by claim 1 wherein said bank of acid occupies from about 5 to about 15 percent of the reservoir pore volume.

6. A process for the recovery of crude oil from a subsurface oil bearing reservoir which comprises injecting sulfuric acid having a concentration in excess of about 90 percent into said reservoir through at least one injection well to establish an acid bank in the vicinity of said injection well, injecting an aqueous driving fluid into said reservoir through said injection well to displace said bank of acid, and recovering crude oil from a production well penetrating said reservoir at a point removed from said injection well.

7. A process for the recovering of crude oil from an underground oil reservoir penetrated by at least one injection well and one production well which comprises injecting a concentrated inorganic acid containing a sulfo group into said reservoir through said injection well until an acid bank occupying from about 1 to about 50 percent of the reservoir pore volume has been established, injecting an aqueous driving fluid through said injection well to move said acid bank toward said production well, and recovering oil displaced by said acid and aqueous driving fluid from said reservoir through said production well.

8. A process as defined by claim 7 wherein said acid is fuming sulfuric acid.

9. A process as defined by claim 7 wherein an acid bank occupying from about 5 to about 15 percent of the reservoir pore volume is established.

10. A process as defined by claim 7 wherein said acid is injected as a solution in oil.

11. A process as defined by claim 7 wherein said driving fluid is water.

12. A process for the recovery of crude oil from a subsurface oil-bearing reservoir penetrated by at least one injection well and one production well which comprises injecting concentrated sulfuric acid into said reservoir through said injection well until an acid bank occupying from about 5 to about 15 percent of the reservoir pore volume has been established about said injection well, injecting water into said reservoir through said injection well to move said acid bank toward said production well, and recovering oil produced from said reservoir through said production well.

13. A process as defined by claim 12 wherein said acid is fuming sulfuric acid.

14. A process for the recovery of crude oil from a subsurface oil-bearing reservoir containing connate water which comprises injecting sulfur trioxide into said reservoir through at least one injection well to establish an acid bank about said well, injecting water into said reservoir through said injection well to move said acid bank away from said injection well, and recovering crude oil displaced by said acid bank from a production well penetrating said reservoir at a point removed from said injection well.

References Cited in the file of this patent

UNITED STATES PATENTS

| | | |
|---|---|---|
| 2,267,548 | Berl | Dec. 23, 1941 |
| 2,288,857 | Subkow | July 7, 1942 |
| 2,765,851 | Bond | Oct. 9, 1956 |
| 2,852,077 | Cocks | Sept. 16, 1958 |
| 2,871,941 | Allen et al. | Feb. 3, 1959 |
| 3,036,631 | Holbrook | May 29, 1962 |
| 3,056,452 | Bernard et al. | Oct. 2, 1962 |

OTHER REFERENCES

Hackh's Chemical Dictionary, Third Edition, 1946, Printing With Changes and Additions, p. 819, printed in U.S.A., by the Maple Press Co.